United States Patent
Pham et al.

(10) Patent No.: US 11,468,310 B2
(45) Date of Patent: Oct. 11, 2022

(54) CONSTRAINING ACTIONS FOR REINFORCEMENT LEARNING UNDER SAFETY REQUIREMENTS

(71) Applicant: INTERNATIONAL BUSINESS MACHINES CORPORATION, Armonk, NY (US)

(72) Inventors: Tu-Hoa Pham, Koto (JP); Giovanni De Magistris, Kawasaki (JP); Ryuki Tachibana, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1087 days.

(21) Appl. No.: 15/914,240

(22) Filed: Mar. 7, 2018

(65) Prior Publication Data

US 2019/0279081 A1  Sep. 12, 2019

(51) Int. Cl.
*G06N 3/08* (2006.01)
*G06N 5/04* (2006.01)

(52) U.S. Cl.
CPC ............... *G06N 3/08* (2013.01); *G06N 5/04* (2013.01)

(58) Field of Classification Search
CPC ............. G06N 3/006; G06N 3/08; G06N 5/04
See application file for complete search history.

(56) References Cited

U.S. PATENT DOCUMENTS

| 9,008,840 | B1 | 4/2015 | Punulak et al. | |
|---|---|---|---|---|
| 2017/0061283 | A1 | 3/2017 | Rasmussen et al. | |
| 2018/0032082 | A1* | 2/2018 | Shalev-Shwartz | B60W 30/09 |
| 2018/0056520 | A1* | 3/2018 | Ozaki | B25J 9/1653 |
| 2018/0136669 | A1* | 5/2018 | Turpin | G08G 5/045 |
| 2019/0113927 | A1* | 4/2019 | Englard | G05D 1/0231 |

OTHER PUBLICATIONS

Wolf et al., "Learning How to Drive in a Real World Simulation with Deep Q-Networks", Jun. 14, 2017, 2017 IEEE Intelligent Vehicles Symposium (IV), pp. 244-250 (Year: 2017).*

Achiam et al., "Constrained Policy Optimization", 2017, Proceedings of the 34 the International Conference on Machine Learning, pp. 1-10 (Year: 2017).*

(Continued)

*Primary Examiner* — Brent Johnston Hoover
(74) *Attorney, Agent, or Firm* — Tutunjian & Bitetto, P.C.; Randall Bluestone

(57) ABSTRACT

A computer-implemented method, computer program product, and system are provided for deep reinforcement learning to control a subject device. The method includes training, by a processor, a neural network to receive state information of a target of the subject device as an input and provide action information for the target as an output. The method further includes inputting, by the processor, current state information of the target into the neural network to obtain current action information for the target. The method also includes correcting, by the processor, the current action information minimally to obtain corrected action information that meets a set of constraints. The method additionally includes performing an action by the subject device based on the corrected action information for the target to obtain a reward from the target.

20 Claims, 7 Drawing Sheets

(56) References Cited

OTHER PUBLICATIONS

Grace Period Disclosure: Pham et al., "Optlayer—Practical Constrained Optimization for Deep Reinforcement Learning in the Real World", https://arxiv.org/abs/1709.07643 Sep. 22, 2017 and Sep. 24, 2017, https://www.youtube.com/watch?v=7liBbk3VjWQ, 8 pages.
Escande et al., "Hierarchical Quadratic Programming: Fast Online Humanoid-Robot Motion Generation", Sage Journals, May 2015, pp. 1-32.
Winih et al., "Human-level control through deep reinforcement learning", Nature, Macmillan Publishers Limited, Feb. 2015, 13 pages.
Schulman et al., "Trust Region Policy Optimization", arXiv:1502.05477v5 [cs.LG] Apr. 20, 2017, 16 pages.
Chow et al.,"Risk-Constrained Reinforcement Learning with Percentile Risk Criteria", arXiv:1512.01629, Apr. 2017, pp. 1-49.
Achiam et al., "Constrained Policy Optimization", arXiv:1705.10528v1 [cs.LG] May 30, 2017, 18 pages.
Kanehira et al., "A Local Collision Avoidance Method for Non-strictly Convex Polyhedra", Robotics: Science and Systems, Jun. 2008, 8 pages.
Junges et al., "Safety-Constrained Reinforcement Learning for MDPs", arXiv:1510.05880, Oct. 2015, 17 pages.

\* cited by examiner

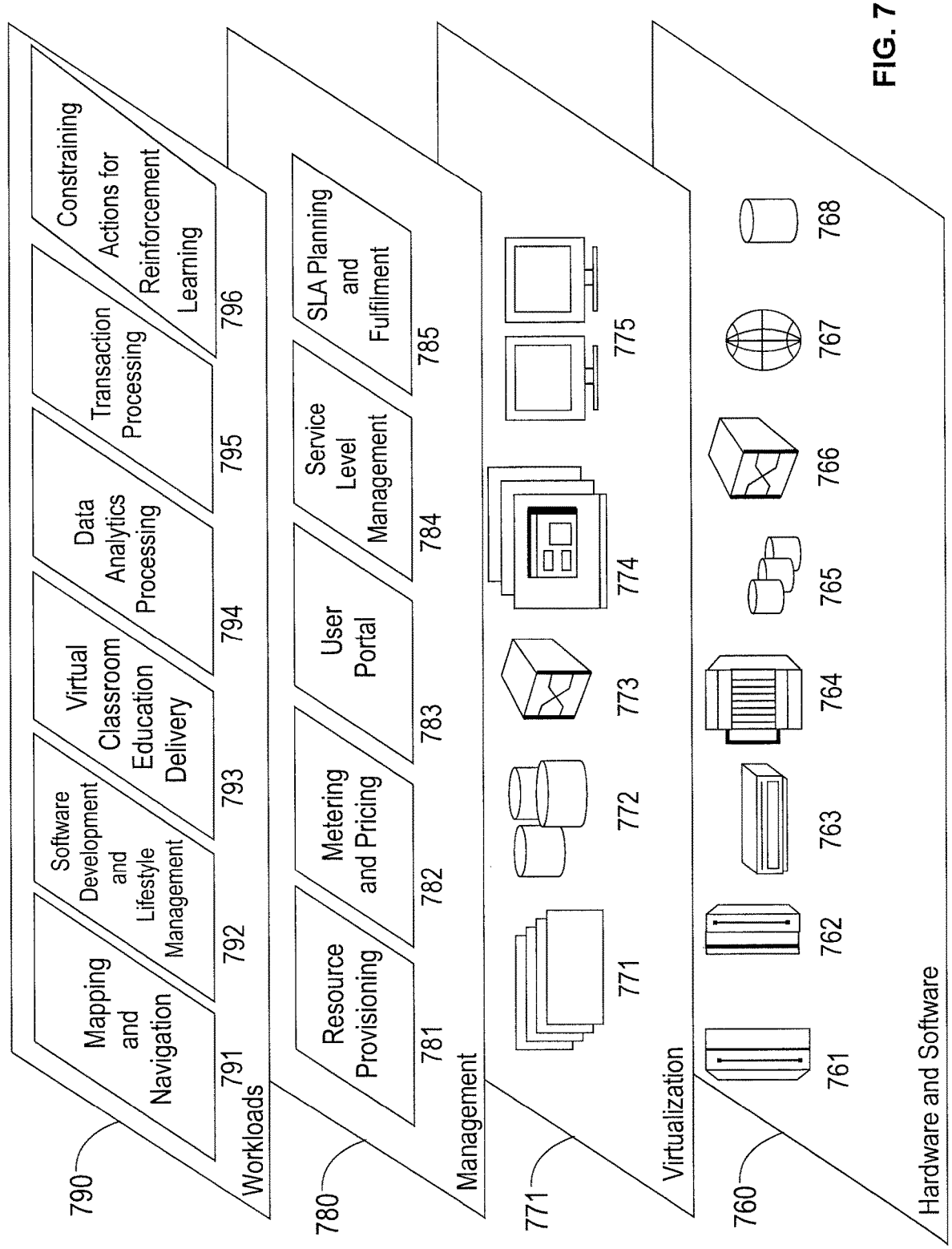

CONSTRAINING ACTIONS FOR REINFORCEMENT LEARNING UNDER SAFETY REQUIREMENTS

STATEMENT REGARDING PRIOR DISCLOSURES BY THE INVENTOR OR A JOINT INVENTOR

The following disclosure(s) are submitted under 35 U.S.C. § 102(b)(1)(A):

DISCLOSURE(S): "Optlayer—Practical Constrained Optimization for Deep Reinforcement Learning in the Real World", Tu-Hoa Pham, Giovanni De Magistris, and Ryuki Tachibana, Sep. 22, 2017, https://arxiv.org/abs/1709.07643 and Sep. 24, 2017, https://www.youtube.com/watch?v=7liBbk3VjWQ.

BACKGROUND

Technical Field

The present invention relates generally to information processing and, in particular, to constraining actions for reinforcement learning under safety requirements.

Description of the Related Art

Reinforcement learning is a powerful method to learn complex tasks without explicit programming. Reinforcement learning can involve, for example a trial and error approach, where good actions are rewarded and bad actions are penalized. Moreover, reinforcement learning can be applied to a myriad of applications including, for example, but not limited to, decision making, robotics, Internet of Things (IoT), and so forth.

However, it may not be desirable to allow a system employing reinforcement learning to perform any possible action. For example, for physical systems (e.g., robotics), actions that can harm a human or the robot should be prohibited. Moreover, in the case of decision systems, it may not be desirable to buy a given stock for more than a given price in a finance system, and it may not be desirable to suggest a treatment that triggers allergies in a healthcare system.

Such possibly costly mistakes limit the applicability of reinforcement learning systems in the real world. Hence, there is a need for a way to prohibit certain actions in systems that use reinforcement learning.

SUMMARY

According to an aspect of the present invention, a computer-implemented method is provided for deep reinforcement learning to control a subject device. The method includes training, by a processor, a neural network to receive state information of a target of the subject device as an input and provide action information for the target as an output. The method further includes inputting, by the processor, current state information of the target into the neural network to obtain current action information for the target. The method also includes correcting, by the processor, the current action information minimally to obtain corrected action information that meets a set of constraints. The method additionally includes performing an action by the subject device based on the corrected action information for the target to obtain a reward from the target.

According to another aspect of the present invention, a computer program product is provided for deep reinforcement learning to control a subject device. The computer program product includes a non-transitory computer readable storage medium having program instructions embodied therewith. The program instructions are executable by a computer to cause the computer to perform a method. The method includes training, by a processor, a neural network to receive state information of a target of the subject device as an input and provide action information for the target as an output. The method further includes inputting, by the processor, current state information of the target into the neural network to obtain current action information for the target. The method also includes correcting, by the processor, the current action information minimally to obtain corrected action information that meets a set of constraints. The method additionally includes performing an action by the subject device based on the corrected action information for the target to obtain a reward from the target.

According to yet another aspect of the present invention, a system is provided for deep reinforcement learning to control a subject device. The system includes a processor. The processor is configured to train a neural network to receive state information of a target of the subject device as an input and provide action information for the target as an output. The processor is further configured to input current state information of the target into the neural network to obtain current action information for the target. The processor is also configured to correct the current action information minimally to obtain corrected action information that meets a set of constraints. The processor is additionally configured to initiate an action to be performed by the subject device based on the corrected action information for the target to obtain a reward from the target.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 7 is a block diagram showing exemplary abstraction model layers, in accordance with an embodiment of the present invention.

DETAILED DESCRIPTION

The present invention is directed to constraining actions for reinforcement learning under safety requirements.

In an embodiment, a reinforcement learning architecture, interchangeably referred to herein as "OptLayer", takes as inputs possibly unsafe actions predicted by a neural network and outputs the closest actions (to the possibly unsafe actions) that satisfy chosen constraints (e.g., safety constraints). The architecture ensures that only safe actions are actually executed and unsafe actions are penalized during training.

In an embodiment, a neural network control strategy is provided to enforce safety constraints during both training and inference. Advantageously, training is faster as compared to conventional reinforcement learning, due to implementations of the present invention avoiding undesirable (unsafe) states during exploration.

It is to be appreciated that the approach of the present invention is readily compatible with any reinforcement learning algorithm that uses actions and rewards. These and other advantages and features of the present invention are readily determined by one of ordinary skill in the art, given the teachings of the present invention provided herein, while maintaining the spirit of the present invention.

Figure 1:
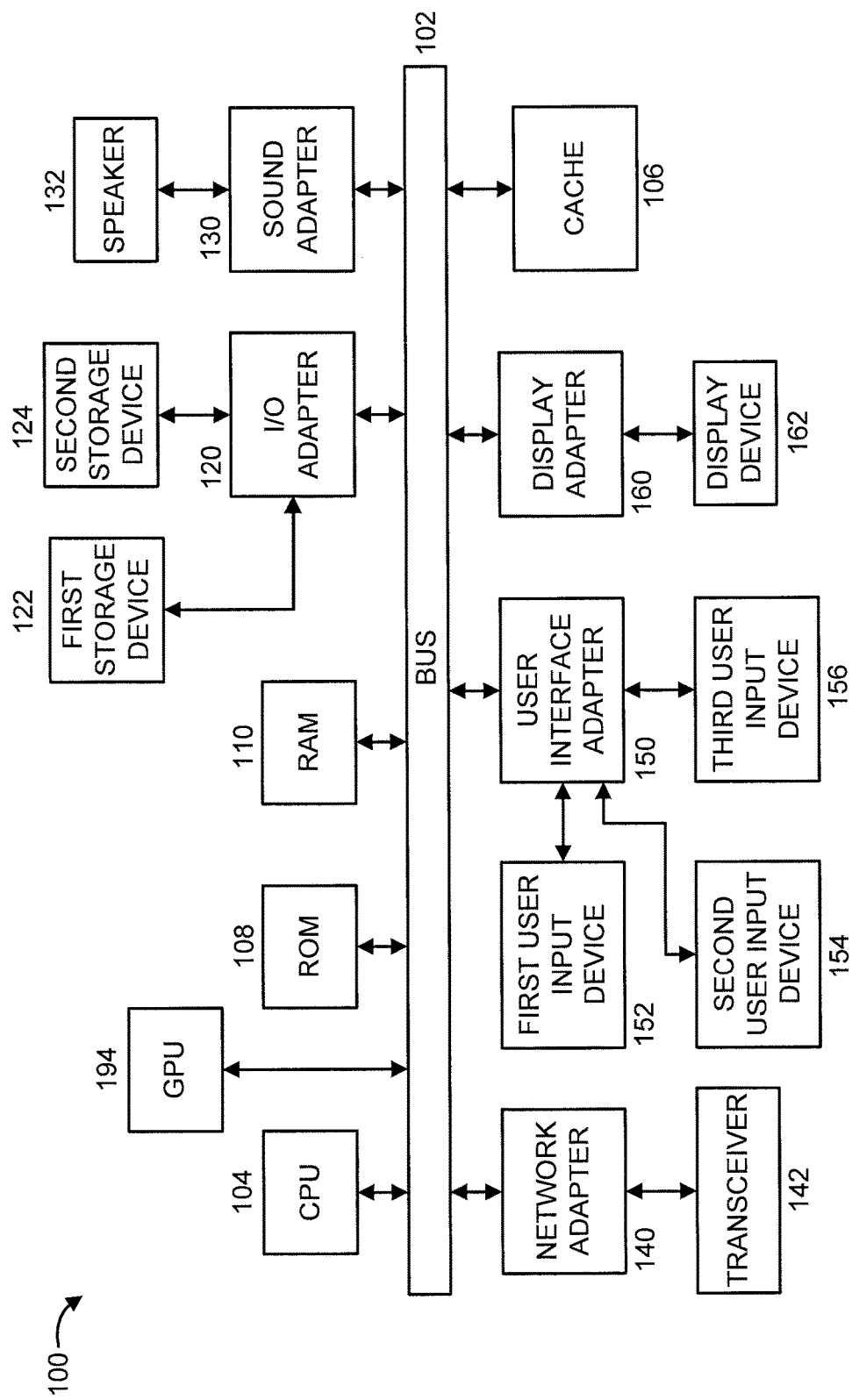
FIG. 1 is a block diagram showing an exemplary processing system to which the invention principles may be applied, in accordance with an embodiment of the present invention.

FIG. 1 is a block diagram showing an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
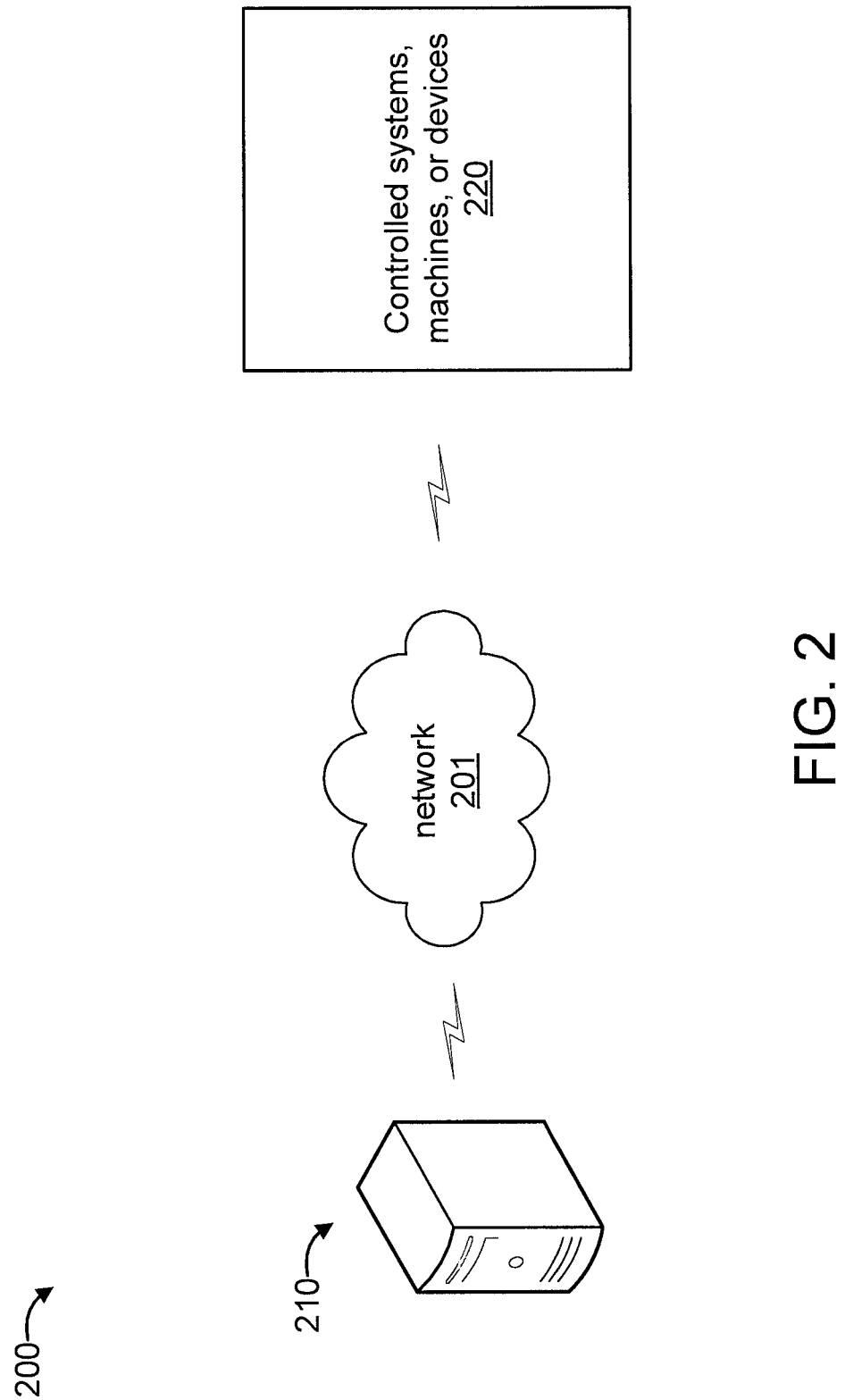
FIG. 2 is a block diagram showing an exemplary environment to which the present invention can be applied, in accordance with an embodiment of the present invention.
Figure 3:
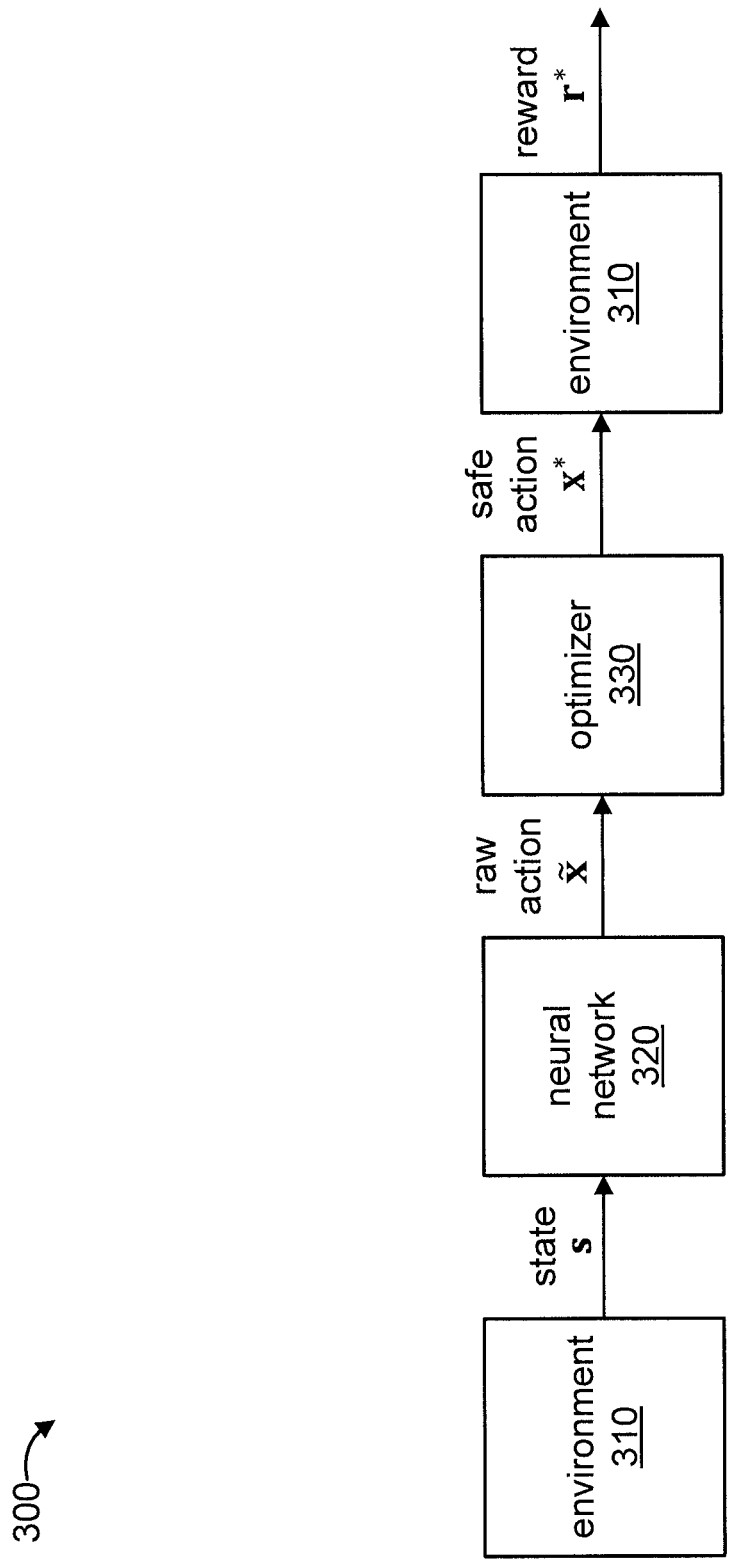
FIG. 3 is a high-level block diagram showing an exemplary architecture, to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200. Also, it is to be appreciated that architecture 300 described below with respect to FIG. 3 is an architecture for implementing respective embodiments of the present invention. Part or all of processing system may be implemented in one or more of the elements of architecture 300.

Figure 4:
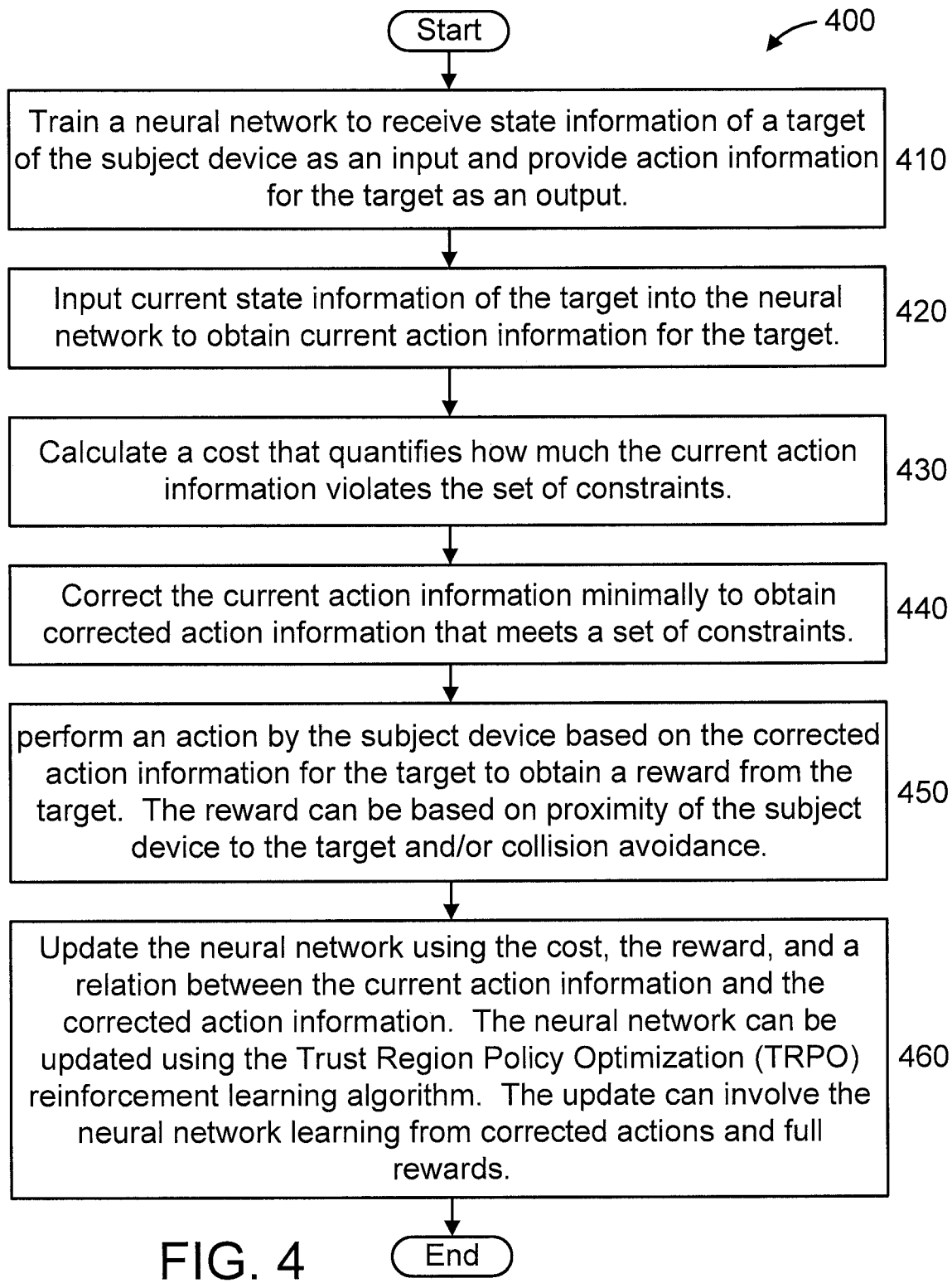
FIG. 4 is a flow diagram showing an exemplary method for constraining actions performed by a subject device for reinforcement learning under safety requirements, in accordance with an embodiment of the present invention.

Further, it is to be appreciated that processing system 100 may perform at least part of the method described herein including, for example, at least part of method 400 of FIG. 4. Similarly, part or all of environment 200 may be used to perform at least part of method 400 of FIG. 4. Additionally, part or all of architecture 300 may be used to perform at least part of method 400 of FIG. 4.

FIG. 2 is a block diagram showing an exemplary environment 200 to which the present invention can be applied, in accordance with an embodiment of the present invention. The environment 200 is representative of a network to which the present invention can be applied. The elements shown relative to FIG. 2 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 200 at least includes a controlling computer processing system 210 and at least one controlled system(s), machine(s), and/or device(s) (individually and collectively denoted by the reference numeral 220 and hereinafter referred to as "controlled system, machine, and/or device"). For the sake of simplicity and illustration, the preceding elements are shown in singular form, but can be readily extended to more than one of any of the preceding elements as readily appreciated by one of ordinary skill in the art given the teachings of the present invention provided herein, while maintaining the spirit of the present invention.

The computer processing system 210 can be any type of computer processing system including, but not limited to, servers, desktops, laptops, tablets, smart phones, media playback devices, and so forth, depending upon the particular implementation. For the sake of illustration, the computer processing system 210 is a server.

The controlling computer processing system 210 is configured to control the operation of the controlled system, machine, and/or device 220 in order to ensure that only safe operations are performed by the same. The safe actions that are ultimately performed are intended to be close in objective to an original action in order to essentially achieve the objective of the original action, but in a safe manner versus an unsafe manner. Such safe action is achieved through the use of equality and inequality constraint enforcement as described in further detail herein below. As is evident to one of ordinary skill in the art, the safe action that is determined and used to replace an original action is so determined based on the implementation and on the applied constraints. In this way, the safe action can be specifically tailored to a specific goal while also being specifically tailored to avoid one or more dangerous actions that could otherwise be performed.

The controlled system, machine, and/or device 220 can be any processor-based physical object. For the sake of illustration, an example involving a robot is described. However, such example is merely illustrative, as one of ordinary skill in the art can appreciated the broad applicability of the present invention to controllable objects. Hence, the present invention, can be applied to these and other controllable objects such as physical objects and non-physical objects including, for example, but not limited to, automobiles, appliances, healthcare systems, automated trading, avatars, and so forth, as readily appreciated by one of ordinary skill in the art.

In the embodiment shown in FIG. 2, the elements thereof are interconnected by a network(s) 201. However, in other embodiments, other types of connections (e.g., wired, etc.) can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIG. 3 is a high-level block diagram showing an exemplary architecture 300, to which the present invention can be applied, in accordance with an embodiment of the present invention.

The architecture 300 includes and/or otherwise involves an operational environment (hereinafter "environment" in short) 310, a neural network $\mathcal{N}$ 320, and an optimizer 330.

The neural network $\mathcal{N}$ 320 takes as input a state vector s and outputs an action vector $\tilde{x}$. Executing the action vector $\tilde{x}$ impacts the environment 310 and yields a reward r (possibly negative).

Equality and inequality constraints of the form Ax=b and Cx≤d can be enforced on the neural network $\mathcal{N}$ 320, in particular, the action vector $\tilde{x}$ output from the neural network $\mathcal{N}$ 320. It is to be appreciated that raw predictions $\tilde{x}=\mathcal{N}(s)$ are not guaranteed to satisfy A$\tilde{x}$=b and C$\tilde{x}$≤d.

An optimization problem is solved by the optimizer 330 that yields the action x* closest to $\tilde{x}$ that satisfies Ax*=b and Cx*≤d. Advantageously, the corrected action x* can be safely executed on the environment 310, yielding a reward r*. From the perspective of the neural network $\mathcal{N}$ 320, $\tilde{x}$ violates the constraints but leads to the same state as x*. The neural network $\mathcal{N}$ 320 is trained using both raw (uncorrected) and corrected actions, with reward and constraint violation cost. Hence, in an embodiment, the optimizer 330 can implement the following:

$\min \|x-\tilde{x}\|^2$, where $Ax^*=b$ and $Cx^*\leq d$.

In the embodiment shown in FIG. 3, the elements thereof can be connected using any signal communication technology. Moreover, in an embodiment, at least one of the elements of environment 300 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 3 can be implemented in a cloud configuration including, for example, in a distributed configuration. Additionally, one or more elements in FIG. 3 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIG. 4 is a flow diagram showing an exemplary method 400 for constraining actions performed by a subject device for reinforcement learning under safety requirements, in accordance with an embodiment of the present invention.

At block 410, train a neural network to receive state information of a target of the subject device as an input and provide action information for the target as an output. From among a set of possible rewards, during training of the neural network, a collision penalization weight can be emphasized more than weights for other types of rewards such as proximity of subject to target. In an embodiment, block 410 is performed to collect as much reward as possible.

At block 420, input current state information of the target into the neural network to obtain current action information for the target.

At block 430, calculate a cost that quantifies how much the current action information violates the set of constraints.

At block 440, correct the current action information minimally to obtain corrected action information that meets a set of constraints.

At block 450, perform an action by the subject device based on the corrected action information for the target to obtain a reward from the target. In an embodiment, the reward can be based on proximity of the subject device to the target and/or collision avoidance. Regarding proximity of the subject device to the target, in an embodiment, the same can involve one or more of the following two constraints: reward on low distance to the target; and bonus on proximity to the target. It is to be appreciated that the preceding constraints and corresponding rewards are merely illustrative and, thus, other constraints and corresponding rewards can also be used in accordance with the teachings of the present invention, while maintaining the spirit of the present invention.

At block 460, update the neural network using the cost, the reward, and a relation between the current action information and the corrected action information. In an embodiment, any reinforcement learning algorithm that uses states, actions, and rewards. In an embodiment, the neural network can be updated using the Trust Region Policy Optimization (TRPO) reinforcement learning algorithm. In TRPO, the neural network can be updated using sequences of states, actions, and rewards to iteratively maximize the discounted return of the policy represented by the neural network. In an embodiment, the update can involve the neural network learning from corrected actions and full rewards (versus the uncorrected actions and discounted rewards used during the training stage). In an embodiment, block 460 is performed to collect as much reward as possible.

A description will now be given regarding a particular implementation of the present invention, in accordance with an embodiment of the present invention.

Figure 5:
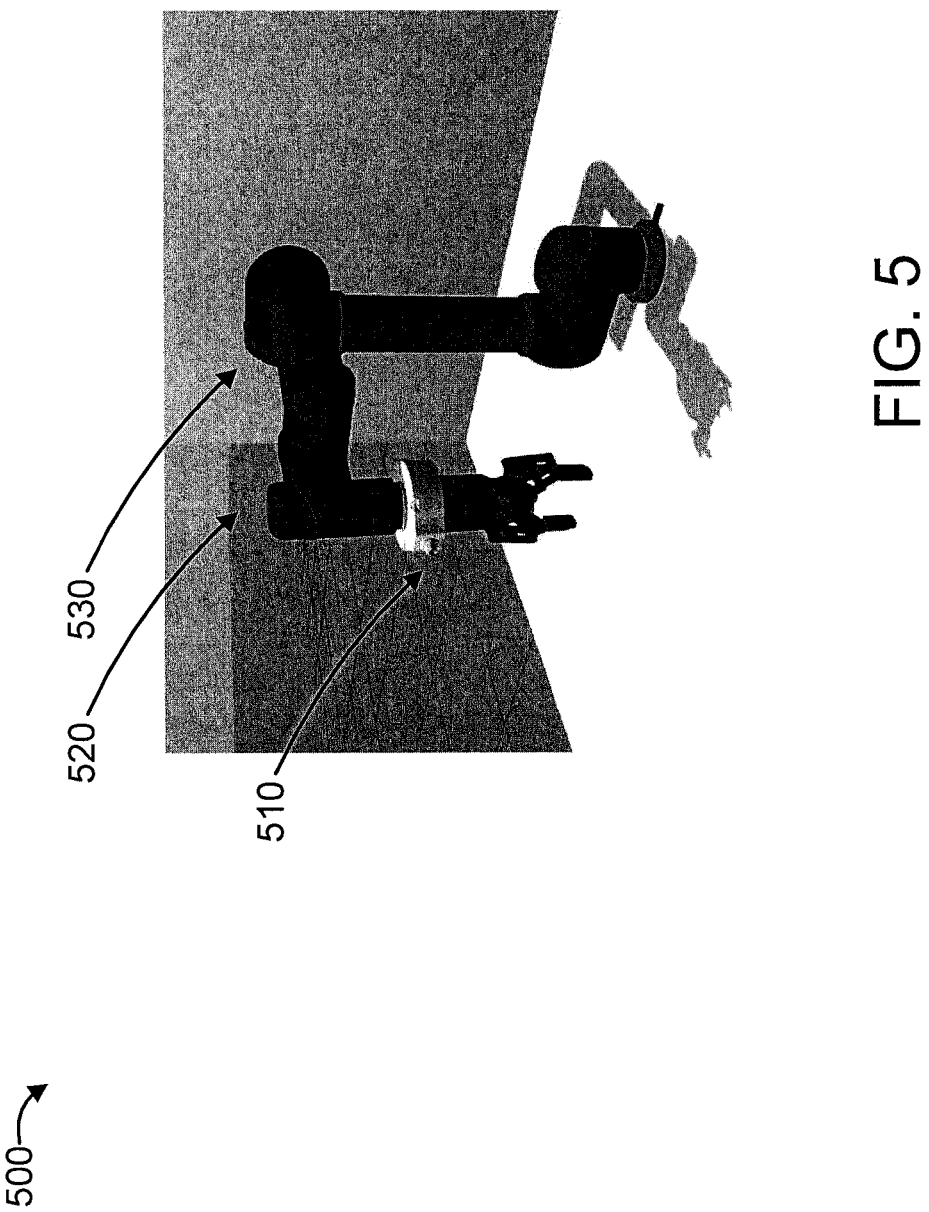
FIG. 5 is a diagram showing an exemplary robot portion to which the present invention can be applied, in accordance with an embodiment of the present invention.

For the sake of illustration, the following implementation is described herein with respect to a robot as follows:

Universal Robot UR5: 6 degrees of freedom, $\mathcal{J}$={shoulder pan, shoulder lift, elbow, wrist 1, wrist 2, wrist 3}. The robot learns to reach a 3D point in space while avoiding collisions with a table, wall, floating obstacle, and itself. For the sake of illustration, FIG. 5 is a diagram showing an exemplary robot portion 500 to which the present invention can be applied, in accordance with an embodiment of the present invention. In an embodiment, the robot portion 500 of FIG. 5 can be included in the controlled system, machine, or device 220 shown and described with respect to FIG. 2 and/or the environment 310 shown and described with respect to FIG. 3. The robot portion 5100 includes a shoulder portion 510 (for at least providing should pan and shoulder lift), an elbow portion 520, and a wrist portion 530 (for at least providing wrist 1 (e.g., x dimension movements), wrist 2 (e.g., y dimension movements), and wrist 3 (z dimension movements).

At time t, state $s_t$ includes joint angles $\theta_t$, velocities $\dot{\theta}_t$, end effector, target and obstacle positions $P_t^E$, $P_t^T$, $P_t^O$.

$\mathcal{N}$ is a 32×32 multilayer perceptron, actions x are joint steps such that $\theta_{t+\Delta T} = \theta_t + x$, with $\Delta T = 0.1$ s The following safety constraints, of the form Cx≤d, are enforced at each time step t:
(a) Joint angle limits: $\theta_{t+\Delta T} \in [\theta_{min}, \theta_{max}]$, with $\theta_{t+\Delta T} = \theta_t + x$;
(b) Joint velocity limits: $\dot{\theta}_{t+\Delta T} \in [\dot{\theta}_{min}, \dot{\theta}_{max}]$, with $\dot{\theta}_{t+\Delta T} = x/\Delta T$;
(c) Joint torque limits: $\tau_t \in [\tau_{min}, \tau_{max}]$ with $\tau$ given by the Newton-Euler equations $$H(q)\ddot{q} + C(q, \dot{q}) = \begin{bmatrix} F_{base} \\ \tau \end{bmatrix};$$

and
(d) Collision avoidance by velocity damping.

Further regarding (c) above, the following applies:
(c1) Left hand-side is a function of joint angles $\theta_t$, velocities $\dot{\theta}_t$ and accelerations $\ddot{\theta}_t = (\dot{\theta}_{t+\Delta T} - \dot{\theta}_t)/\Delta T$;
(c2) Since $\dot{\theta}_{t+\Delta T}$ is a linear function of x, so is $\ddot{\theta}_t$ and thus the complete left hand-side Further regarding (d) above, the following applies:
(d1) When the distance d from the robot to an obstacle becomes smaller than an influence distance $d_i = 5$ cm, activate velocity constraint $$(\dot{q} \mid J(q, p_1)^T n) \geq -\xi \frac{d - d_s}{d - d_i},$$

with $p_1$ the closest point on the robot, $J(q,p_1)$ the Jacobian matrix at $p_1$, n the collision normal, $d_s = 1$ cm a safety distance and $\xi = 1$ a damping coefficient.

Regarding rewards, the following is implicated:
(a) $r_t^{dist} = -\|P_t^T - P_t^E\|$: minimize the distance between the target and the end effector;
(b) In addition, if the distance is below a threshold $d_r = 5$ cm, give a bonus reward $r_t^{bonus} = 1$, otherwise $r_t^{bonus} = 0$;

(c) In case of collision, interrupt the episode and give a negative reward $r_t^{coll} = -20$; and
(d) If x=0 (no solution found), reward $r_t^{idle} = -1$. If the robot is idle for more than 5 steps, interrupt the episode.

Constraint violation cost with respect to Cx≤d:
(a) For each row $C^{(i)}$, $d^{(i)}$ of C, d, the constraint is verified when $C^{(i)}x - d^{(i)} \leq 0$ and violated when $C^{(i)}x - d^{(i)} > 0$;
(b) We compute the constraint violation cost i as $v^{(i)} = \max(C^{(i)}x - d^{(i)}, 0)$, such that $v^{(i)} > 0$ when constraint i is violated; and
(c) Since individual constraints $C^{(i)}x \leq d^{(i)}$ are invariant by positive scalar multiplication, we define the total constraint violation cost by the sum of the individual violation costs normalized by the norm of $C^{(i)}$:

$$v = \sum \frac{v^{(i)}}{\|C^{(i)}\|}.$$

We train a neural network on a simulated robot using the TRPO reinforcement learning algorithm. The TRPO algorithm updates the neural network using state, action, reward sequences $(s_t, x_t, r_t)_{t=0, \ldots, N}$. Regarding Unconstrained Predictions (UP): learn from unconstrained exploration→baseline.

With our approach, correct raw predictions, execute safe actions and obtain rewards, violation costs: $(s_t, \tilde{x}_t, x_t^*, r_t^*, v_t)_t$:
(a) Constrained—learn Predictions (CP): learn from $(s_t, \tilde{x}_t, r_t^*)_{t=0, \ldots, N}$→naïve combination 1;
(b) Constrained—learn Corrections (CC): learn from $(s_t, x_t^*, r_t^*)_{t=0, \ldots, N}$→naïve combination 2; and
(c) Constrained—learn Predictions and Corrections (CPC): learn first from raw actions and discounted rewards $(s_t, \tilde{x}_t, r_t^* - v_t)_{t=0, \ldots, N}$, then from corrected actions and full rewards $(s_t, x_t^*, r_t^*)_{t=0, \ldots, N}$→our approach.

In comparing the aforementioned UP, CP, CC, CPC update strategies, the following was observed: (i) without constraints UP, collisions throughout training; (ii) with CP, comparable convergence without collisions; (iii) with CC, no collision but no convergence; and (iv) with CPC, faster convergence.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
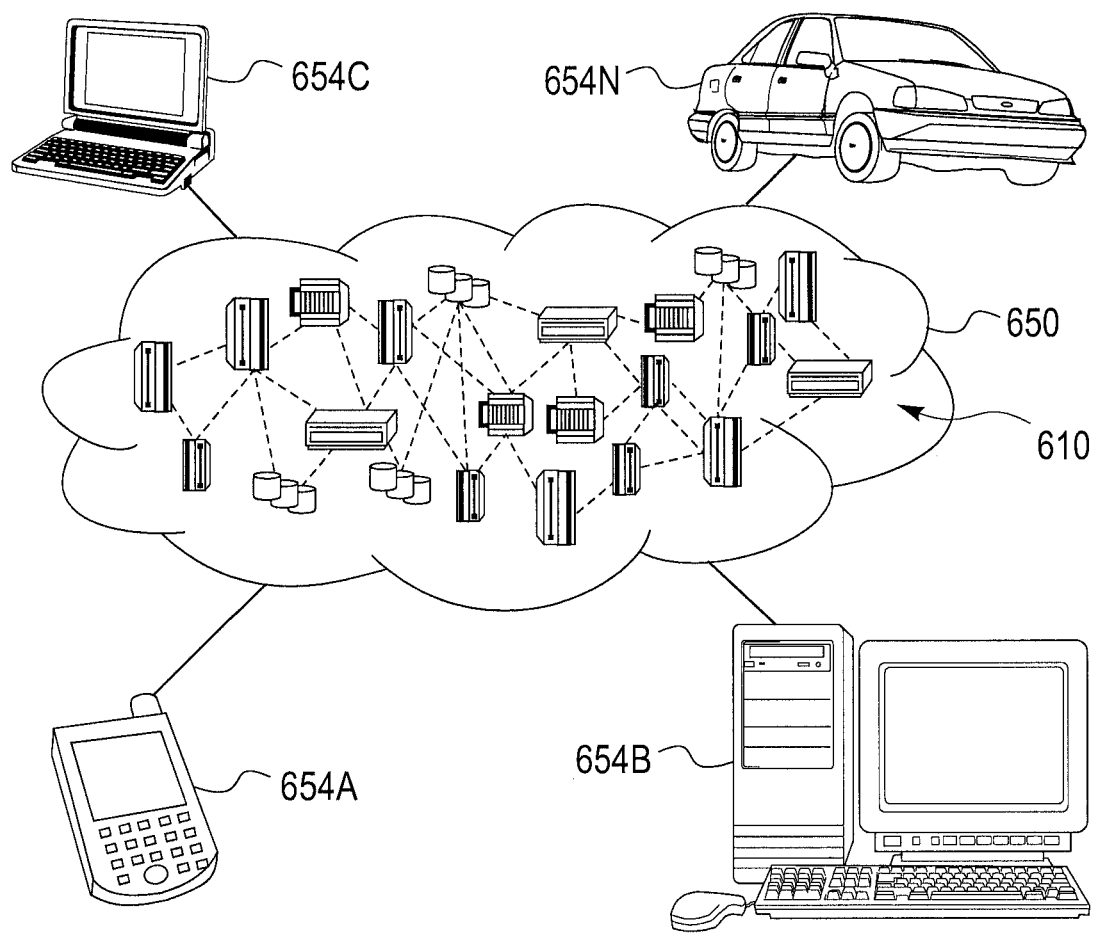
FIG. 6 is a block diagram showing an exemplary cloud computing environment, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and constraining actions for reinforcement learning under safety requirements 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for deep reinforcement learning to control a subject device, the method comprising:
    training, by a processor, a neural network to receive state information of a target of the subject device as an input and provide action information for the target as an output;
    inputting, by the processor, current state information of the target into the neural network to obtain current action information for the target;
    correcting, by the processor, the current action information to obtain corrected action information that meets a set of safety constraints including a joint angle constraint, a joint torque constraint, and a joint velocity constraint, wherein when the subject device and the target are closer than a fixed predetermined influence distance, the joint velocity constraint is activated on the subject device to maintain a fixed predetermined shorter distance between the subject device and the target than the fixed predetermined influence distance using velocity control to avoid a subject device to target collision; and
    performing a velocity dampening action by the subject device based on the corrected action information for the target and the joint velocity constraint to obtain a reward from the target.

2. The computer-implemented method according to claim 1, further comprising:
    calculating a cost that quantities bow much the current action information violates the set of constraints; and
    updating the neural network using the cost, the reward, and a relation between the current action information and the corrected action information.

3. The computer-implemented method according to claim 2, wherein said updating step is performed by a reinforcement learning algorithm that uses states, actions and rewards.

4. The computer-implemented method of claim 1, wherein the reward is based on a metric selected from a group consisting of proximity of the subject device to the target and collision avoidance by the subject device.

5. The computer-implemented method of claim 4, wherein the proximity of the subject device to the target comprises a first and a second reward basis, the first reward basis comprising providing a reward when a distance from the subject device to the target is less than a first threshold distance, and the second reward basis comprising providing a bonus reward when the distance from the subject device to the target device is less than a second threshold distance, wherein the first threshold distance is greater than the second threshold distance.

6. The computer-implemented method of claim 1, wherein the subject device comprises a processor-based controllable physical object.

7. The computer-implemented method of claim 1, wherein the subject device is a processor-based robot.

8. The computer-implemented method of claim 1, wherein, during a training stage, the neural network is trained to learn initially from uncorrected actions and discounted rewards and subsequently learn from corrected actions and full rewards in order to optimize neural network performance during an inference stage.

9. The computer-implemented method of claim 8, further comprising performing reward evolution based on collision penalization to transition from the discounted rewards to the full rewards.

10. The computer-implemented method of claim 1. wherein the set of constraints comprise safety constraints.

11. The computer-implemented method of claim 1, further comprising interrupting the action performed by the subject device and provide a negative reward when a collision occurs between the subject device and target.

12. A computer program product for deep reinforcement learning to control a subject device, the computer program product comprising a non-transitory computer readable storage medium having program instructions embodied therewith, the program instructions executable by computer to cause the computer to perform a method comprising:
    training, by a processor, a neural network to receive state information of a target at the subject device as an input and provide action information for the target as an output;
    inputting, by the processor, current state information of the target into the neural network to obtain current action information for the target;
    correcting, by the processor, the current action information to obtain corrected information that meets a set of safety constraints including a joint angle constraint, a joint torque constraint, and a joint velocity constraint, wherein when the subject device and the target are closer than a fixed predetermined influence distance, the joint velocity constraint is activated on the subject device maintain a fixed predetermined shorter distance between the subject device and the target than the fixed predetermined influence distance using velocity control to avoid a subject device to target collision; and performing a city dampening actionby the subject device based on the corrected action information for the target and the joint velocity constraint to obtain a reward from the target.

13. he computer program product according to claim 12, wherein the method further comprises:

calculating a cost that quantities how much the current action information violates the set of constraints; and updating the neural network using the cost, the reward, and a relation between the current action information and the corrected action information.

14. The computer program product according to claim 13, wherein said updating step is performed by a reinforcement learning algorithm that uses states, actions and rewards.

15. The computer program product of claim 12, wherein the reward is based on a metric selected from a group consisting of proximity of the subject device to the target and collision avoidance by the subject device.

16. The computer program product of claim 15, wherein the proximity of the subject device to the target comprises a first and a second reward basis, the first reward basis comprising providing a reward when a distance from the subject device to the target is less than a first threshold distance, and the second reward basis comprising providing a bonus reward when the distance from the subject device to the target device is less than a second threshold distance, wherein the first threshold distance is greater than the second threshold distance.

17. The computer program product of claim 12, wherein the subject device comprises a processor-based controllable physical object.

18. The computer program product of claim 12, wherein, during a training stage, the neural network is trained to learn initially from uncorrected actions and discounted rewards and subsequently learn from corrected actions and full rewards in order to optimize neural network performance during an inference stage.

19. The computer program product of claim 12, wherein the method further comprises performing rewa rdevolution based on collision penalization to transition from the discountedrewards to the full rewards.

20. A system for deep rein orcement learning to control a subject device,the system comprising:

a processor configured to train a neural network to receive state information of a target of the subject device as an input and provide action information for the target as an output;

input current state information of the target into the neural network to obtain current action information for the target;

correct the current action information to obtain corrected action information that meets a set of safety constraints including a joint angle constraint, a joint torque constraint, and a joint velocity constraint, wherein when the subject device and the target are closer than a fixed predetermined influence distance, the joint velocity constraint is activated on the subject device to maintain a fixed predetermined shorter distance between the subject device and the target than the fixed predetermined influence distance using velocity control to avoid a subject device to target collision; and initiate, under the joint velocity constraint, a velocity dampening action to be performed by the subject device based on the corrected action information for the target to obtain a reward from the target.

\* \* \* \* \*